(12) United States Patent
Vito (10) Patent No.: US 6,463,772 B2
(45) Date of Patent: *Oct. 15, 2002

(54) ANTI-THEFT BRAKE OR CLUTCH PEDAL LOCKING DEVICE

(76) Inventor: Robert A. Vito, 1434 Sugartown Rd., Berwyn, PA (US) 19312-1820

( * ) Notice: Subject to any disclaimer, the term of this patent is extended or adjusted under 35 U.S.C. 154(b) by 0 days.

This patent is subject to a terminal disclaimer.

(21) Appl. No.: 09/971,729

(22) Filed: Oct. 5, 2001

(65) Prior Publication Data

US 2002/0014097 A1 Feb. 7, 2002

Related U.S. Application Data (63) Continuation of application No. 09/772,181, filed on Jan. 29, 2001, now Pat. No. 6,298,696, which is a continuation of application No. 09/495,098, filed on Feb. 1, 2000, now Pat. No. 6,192,724, which is a continuation-in-part of application No. 09/268,803, filed on Mar. 16, 1999, now Pat. No. 6,089,055, which is a continuation-in-part of application No. PCT/US98/12521, filed on Jun. 17, 1998, which is a continuation-in-part of application No. 09/004,666, filed on Jan. 8, 1998, now Pat. No. 5,881,587, which is a continuation-in-part of application No. 08/949,009, filed on Oct. 10, 1997, now Pat. No. 5,870,912.

(51) Int. Cl.⁷ .............................................. F16H 57/00
(52) U.S. Cl. .............................. 70/207; 70/201; 70/237
(58) Field of Search .......................... 70/198–204, 237, 70/238

(56) References Cited

U.S. PATENT DOCUMENTS 2,330,536 A    9/1943   Zimmermann (List continued on next page.)

FOREIGN PATENT DOCUMENTS

| DE | 92 15 118.3 | 2/1993 |
| EP | 0 404 709 | 12/1990 |

(List continued on next page.)

OTHER PUBLICATIONS

Alll–Star Products™ Automotive Brake Lock, Winner International, approx. 2000.

*Primary Examiner*—Suzanne Dino Barrett
(74) *Attorney, Agent, or Firm*—Akin, Gump, Strauss, Hauer & Feld, L.L.P.

(57) ABSTRACT

A device to lock a brake or clutch pedal of a vehicle so as to deter theft of the vehicle includes a base for placement on the floor of the vehicle beneath the pedal of the vehicle being locked and beneath a pedal shaft supporting the pedal. The device includes a generally U-shaped housing with a second leg attached to the base, a first leg shorter than the second leg, and a cross member connecting the first and second legs to define an opening between the first leg and the base and a slot between the first and second legs to receive the pedal shaft and permit travel of the pedal shaft through the slot. A locking mechanism includes a locking pin and a lock. The locking pin is selectively movable on the U-shaped housing between a raised locked position sufficiently close to a lower side of the pedal shaft to prevent the pedal shaft from being operably depressed, i.e., depressed sufficiently to enable the vehicle to be started or clutch or brake to be used and a retracted position to permit travel of the pedal shaft through the slot and opening. The locking pin is on the end of a rod which extends through the second leg and a housing of the lock fixed to the U-shaped housing above the second leg. A handle at an opposing upper end of the rod is pitched and shaped to deflect blows. The lock has an upper face with a key opening. The upper face faces substantially oppositely away from the base at a transverse angle to the base and to a perpendicular angle to the base. A barrel type key lock cylinder is used. The lock housing has multiple, mostly non-rectangular lateral sides to discourage cutting. The housings around the rod are made from hardened metals. The shorter, first leg is welded on its three outer sides to the cross member and is generally U-shaped with a deflection in its own cross wall for greater strength.

7 Claims, 11 Drawing Sheets

U.S. PATENT DOCUMENTS

| | | | |
|---|---|---|---|
| 2,744,409 A | | 5/1956 | Wintle, Jr., et al. |
| 3,245,239 A | | 4/1966 | Zaidner |
| 3,889,499 A | | 6/1975 | Cramer |
| 4,040,675 A | | 8/1977 | Richmond |
| 4,471,852 A | | 9/1984 | Schield et al. |
| 4,493,198 A | | 1/1985 | Brown |
| 4,738,127 A | | 4/1988 | Johnson |
| 4,779,435 A | * | 10/1988 | Farrow .................. 70/238 |
| 4,934,492 A | | 6/1990 | Hayes-Sheen |
| 5,040,387 A | | 8/1991 | Knott, Jr. |
| 5,267,458 A | | 12/1993 | Heh |
| 5,282,373 A | * | 2/1994 | Riccitelli .................. 70/199 |
| 5,345,796 A | | 9/1994 | Chieh et al. |
| 5,537,846 A | * | 7/1996 | Simon .................. 70/202 |
| 5,653,133 A | | 8/1997 | Passantino |
| 5,678,433 A | | 10/1997 | Riccitelli |
| 5,704,233 A | | 1/1998 | Farshad |
| 5,715,710 A | | 2/1998 | DeLucia et al. |
| 5,778,706 A | | 7/1998 | Testa |
| 5,870,912 A | * | 2/1999 | Vito .................. 70/202 |
| 5,881,587 A | * | 3/1999 | Vito .................. 70/202 |
| 5,906,121 A | | 5/1999 | Mankarious |
| 5,911,765 A | | 6/1999 | DaSilva |
| 5,950,463 A | * | 9/1999 | Glazier et al. .................. 70/202 |
| 5,979,197 A | * | 11/1999 | Mellini et al. .................. 70/199 |
| 6,089,055 A | * | 7/2000 | Vito .................. 70/202 |
| 6,192,724 B1 | * | 2/2001 | Vito .................. 70/202 |
| 6,202,456 B1 | | 3/2001 | Vickers |
| 6,298,696 B2 | * | 10/2001 | Vito .................. 70/202 |

FOREIGN PATENT DOCUMENTS

| | | | |
|---|---|---|---|
| FR | 862 868 | 3/1941 | |
| FR | 2 419 846 | 10/1979 | |
| FR | 2 422 529 | 11/1979 | |
| FR | 2 443 946 | 7/1980 | |
| FR | 2 579 943 | 10/1986 | |
| FR | 2 580 243 | 10/1986 | |
| FR | 2 681 823 | 4/1993 | |
| FR | 2 719 005 | 10/1995 | |
| FR | 2 744 409 | 8/1997 | |
| GB | 160160 | 12/1921 | |
| GB | 2 023 520 | 1/1980 | |
| GB | 2 091 656 | 8/1982 | |
| GB | 2 246 105 | 1/1992 | |
| GB | 2255060 | * 10/1992 | .................. 70/202 |
| JP | 58-145547 | 8/1983 | |
| WO | 97/15476 | 5/1997 | |
| WO | WO 99/19643 | 4/1999 | |
| WO | WO 99/20920 | 4/1999 | |

* cited by examiner

Fig. 16

ANTI-THEFT BRAKE OR CLUTCH PEDAL LOCKING DEVICE

CLAIM OF PRIORITY

This patent application is a continuation of application Ser. No. 09/772,186, now U.S. Pat. No. 6,298,696 filed Jan. 29, 2001, which is a continuation of application Ser. No. 09/495,098, now U.S. Pat. No. 6,192,724 filed Feb. 1, 2000, which is a continuation-in-part of application Ser. No. 09/268,803, now U.S. Pat. No. 6,089,055 filed Mar. 16, 1999, which is a continuation-in-part of PCT/US98/12521 filed Jun. 17, 1998, which is a continuation in-part of application Ser. No. 09/004,666 now U.S. Pat. No. 5,881,587 filed Jan. 8, 1998, which is a continuation-in-part of application Ser. No. 08/949,009, now U.S. Pat. No. 5,870,912 filed Oct. 10, 1997.

FIELD OF THE INVENTION

This invention relates to anti-theft brake or clutch pedal locking devices for vehicles which are particularly suitable for both automatic and standard transmission vehicles. More particularly, this invention relates to devices which prevent the brake or clutch pedal from being depressed, thereby rendering a vehicle inoperable.

BACKGROUND OF THE INVENTION

Automotive theft is a major worldwide problem. The U.S. Federal Bureau of Investigation has reported that a car is stolen every 20 seconds.

The proliferation of mechanical type anti-theft devices for motor vehicles have resulted in the commercial availability of different types of anti-theft devices. One type of prior art system mechanically locks the brake and accelerator by means of two independent or articulated shoes which lock the pedals. The major problem stemming from the use of such devices is that the driver has to reach out for the pedal area or actually get down on his or her knees in order to operate the locking device, and the varying distance between the brake and accelerator which can prevent the device from being installed.

More recently, some devices have been suggested which are constructed from a long rod consisting of an anti-picking material and which is provided at both ends with two shaped members that couple respectively with a pedal and with the steering wheel of the vehicle. The coupling with the steering wheel is locked using a safety lock that prevents the same from being disengaged. This device, which owing to its characteristics, can be employed on traditional transmission cars as well as on automatic transmission vehicles, is affected in the main by two drawbacks.

First, the connection, due it longitudinal size and cumbersomeness is difficult to store when the device is not being utilized. Secondly, devices of this nature actually have a poor record against theft. Indeed, it is relatively easy to cut the rim of the steering wheel by means of a saw or the like. The rim of the steering wheel is usually not a viable obstacle for thieves, and the anti-theft device by can be disengaged merely pulling apart the two ends of the rim. Such devices are also not usually adaptable for automatic transmission vehicles because of their structural characteristics.

In UK patent application No. 2,091,656, an anti-theft pedal-locking device for vehicles is described comprising a first supporting member extending upwards and provided with a safety lock and with a laterally projecting member and a second supporting member, upon which the first supporting member slides. A projecting member cooperates with the corresponding member of the first supporting member so as to lock a pedal of the vehicle when the latter member is in its lower position, while the lower end of the second supporting member may carry a base member to rest on the floor of the vehicle.

A number of United States Patents have also issued on brake locking mechanisms. U.S. Pat. No. 4,040,675 discloses a vehicle anti-theft device which maintains the braking function of the braking fluid by preventing reverse flow thereof from the wheel cylinder back to the master cylinder until an authorized procedure permits said backflow.

U.S. Pat. No. 4,493,198 discloses an anti-theft lock for a pedal operated apparatus. The invention incorporates first and second stop bodies which are arranged to clamp around the lever of a pedal. When the stop bodies are locked in place, the pedal cannot be operated unless the apparatus is restrained.

U.S. Pat. No. 4,934,492 discloses an automatic brake-locking mechanism which locks the brake of a vehicle having a hydraulic brake system. The system incorporates a safety switch provided to operate in conjunction with the ignition switch so that the safety switch and the ignition both must be operated to an "on" position to release the auxiliary brake device to allow normal operation of the vehicle.

U.S. Pat. No. 5,040,387 similarly discloses a vehicle brake lock assembly which engages a brake pedal and which includes a U-shaped end portion which engages the brake pedal telescopically to lock the brake pedal in position.

U.S. Pat. No. 5,345,796 discloses a vehicle brake-pedal locking device which mechanically maintains the vehicle brake pedal in a depressed position to prevent the vehicle from being driven. The device includes a horizontally and vertically pivoting brake-pedal swing arm interfacing structure.

Finally, U.S. Pat. No. 5,653,133 discloses an anti-theft device for vehicles having a steering wheel and a brake. The device comprises a brake guard moveably mounted to a fixed portion of the brake, a lower elongated member which hooks to the brake guard, an upper elongated member which is locked to the lower elongated member, a wide bar spaced a distance adaptable to be placed around the steering wheel and a locking bar and a claw member. When the device is secured with two padlocks, movement of the steering wheel and the brake pedal is prevented.

All of the above devices are so called active devices which must be actively placed on a vehicle. Passive alarms have also recently gained popularity, but these devices are expensive and frequently activate when a vehicle is accidentally struck. In addition to above discussed devices and technologies, the prior art also includes complex tracking devices which send out signals to police if a vehicle is reported stolen. The search may take up to 24 hours or longer with no guarantee of recovery. Installation of these systems is expensive and require a monthly monitoring fee. Automotive alarms are similarly expensive and may be deactivated by car thieves.

While the prior art is replete with mechanisms and inventions for locking the brake pedals of a vehicle, there is no simple and easy system devised for swiftly securing the brake or clutch pedal in a non-depressible state without the driver or operator having to get down on his or her knees or crouch down. Such a system would be to disable a vehicle, because many automobiles built since 1990 cannot start or cannot be placed into gear without the brake or clutch pedal being depressed.

The present invention is thus directed to a brake pedal or clutch pedal locking mechanism which does not require the driver or vehicle operator to get down on his knees or to move beneath the vehicle and which prevents the brake pedal or clutch pedal from being depressed. These and other objects of the present invention will be described with reference to the following summary and detailed description.

SUMMARY OF THE INVENTION

In one aspect, the invention is a device to lock a brake or clutch pedal of a vehicle so as to deter theft of the vehicle. The device comprises: a base for placement on the floor of the vehicle beneath the pedal of the vehicle and a pedal shaft supporting the pedal; a generally U-shaped housing having a second leg attached to the base member, a first leg shorter than the second leg, and a cross member connecting the first and second legs to define an opening between the first leg and the base and a slot between the first and second legs, the opening and slot being sufficiently large to receive the pedal shaft and permit travel of the pedal shaft through the slot; a locking pin selectively movable on the U-shaped housing between a raised position sufficiently close to a lower side of the pedal shaft to prevent the pedal shaft from being depressed sufficiently to enable the vehicle to be started and a retracted position to permit travel of the pedal shaft through the slot and opening; and a lock coupled to the U-shaped housing and operably connected to the locking pin to fix the locking pin in at least the raised position, the lock having an upper face with a key opening, the upper face facing substantially oppositely away from the base.

In another aspect the invention is a device to lock a brake or clutch pedal of a vehicle so as to deter theft of the vehicle, the device comprising: a base for placement on the floor of the vehicle beneath the pedal of the vehicle and a pedal shaft supporting the pedal; a generally U-shaped housing having a second leg attached to the base member, a first leg shorter than the second leg, and a cross member connecting the first and second legs to define an opening between the first leg and the base and a slot between the first and second legs, the opening and slot being sufficiently large to receive the pedal shaft and permit travel of the pedal shaft through the slot; a rod movable through the U-shaped housing; a locking pin on one end of the rod, the locking pin being selectively movable on the rod between a raised position sufficiently close to a lower side of the pedal shaft to prevent the pedal shaft from being depressed sufficiently to enable the vehicle to be started; a handle on an opposing end of the rod, the handle extending transversely to one side of the rod at a non-perpendicular angle to the rod, the handle being made in one piece and having a creaseless, seamless outer surface beyond the rod; and a lock coupled to the U-shaped housing and operably connected to the locking pin through the rod to fix the locking pin in at least the raised position.

In another aspect, the invention is a device to lock a brake or clutch pedal of a vehicle so as to deter theft of the vehicle. The device comprises a base for placement on the floor of the vehicle beneath the pedal of the vehicle and a pedal shaft supporting the pedal; a generally U-shaped housing having a second leg attached to the base, a first leg shorter than the second leg, and a cross member connecting the first and second legs to define an opening between the first leg and the base and a slot between the first and second legs, the opening and slot being sufficiently large to receive the pedal shaft and permit travel of the pedal shaft through the slot; and a locking mechanism including a locking pin and a lock, the locking pin being selectively movable on the U-shaped housing between a raised position sufficiently close to a lower side of the pedal shaft to prevent the pedal shaft from being operably depressed and a retracted position to permit travel of the pedal shaft through the slot and opening, the lock being coupled to the U-shaped housing and operably connected to the locking pin to fix the locking pin in at least the raised position, the lock having an upper face with a key opening, the upper face facing substantially oppositely away from the base.

BRIEF DESCRIPTION OF THE FIGURES

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE PREFERRED EMBODIMENT

The brake anti-theft device of the present invention is now described with reference to the enclosed Figures wherein the same numbers are utilized where applicable. In general, the present invention is a device specifically designed to lock the brake pedal or clutch pedal of a motor vehicle in an up, i.e., non-depressed, state.

Since 1990, many vehicles manufactured for sale in North America cannot start unless the brake pedal of the vehicle is depressed. In vehicles with automatic-shifting transmissions, this feature is referred to as a "brake pedal shift interlock" or BPSI. Many non-automatic transmission, or "standard transmission" vehicles, have a similar feature called the clutch pedal start interlock or CPSI, which requires that the clutch pedal be depressed before the vehicle can start. The present invention is applicable to both types of vehicles. In essence, the invention is specifically designed to take advantage of the BPSI or CPSI by preventing the brake pedal of any vehicle, or the clutch pedal of a standard-transmission vehicle, from being operably depressed, i.e. depressed sufficiently to disable the CPSI or BPSI to thereby precluding starting and/or driving of the vehicle. The present invention is also designed to work on vehicles not having BPSI or CPSI, discounting theft merely by preventing the brake or clutch pedal from being operably depressed, thereby preventing the vehicle from being normally braked or its transmission shifted, respectively.

A particular feature of the present invention is that it is intended to be utilized by the driver or operator from the comfort of the driver's seat of the vehicle without any need for the driver to get down on his or her hands or knees or to crouch in order to install or adjust the device. While the present invention will be described in the context of a conventional automobile it is to be appreciated that the teachings of the present invention are equally applicable to all manner of vehicles having brake pedal or clutch pedal arms or shafts including sport utility vehicles, vans, pick-up trucks and heavy trucks.

For purposes of explanation the present invention is now described in the context of a device which locks a brake pedal in an upward position, thus, for example, disabling the BPSI of the vehicle. Referring now to FIGS. 1 to 4, there is shown a first preferred embodiment of the brake or clutch lock anti-theft device 10 of the present invention having a base 12 which is configured for stable placement on the floor of the vehicle adjacent to, i.e., beneath, the brake pedal 11 and shaft 13 supporting the pedal 11. Use of a brake pedal 11 and shaft 13 is intended to be illustrative of the application of the present invention to either a brake pedal 11 or a clutch pedal (not shown) and is not intended to be limiting. The base 12 is configured to be placed flush to the floor of the vehicle directly below the brake pedal and pedal shaft 13 for stable support of the device 10.

Figures 1, 2:
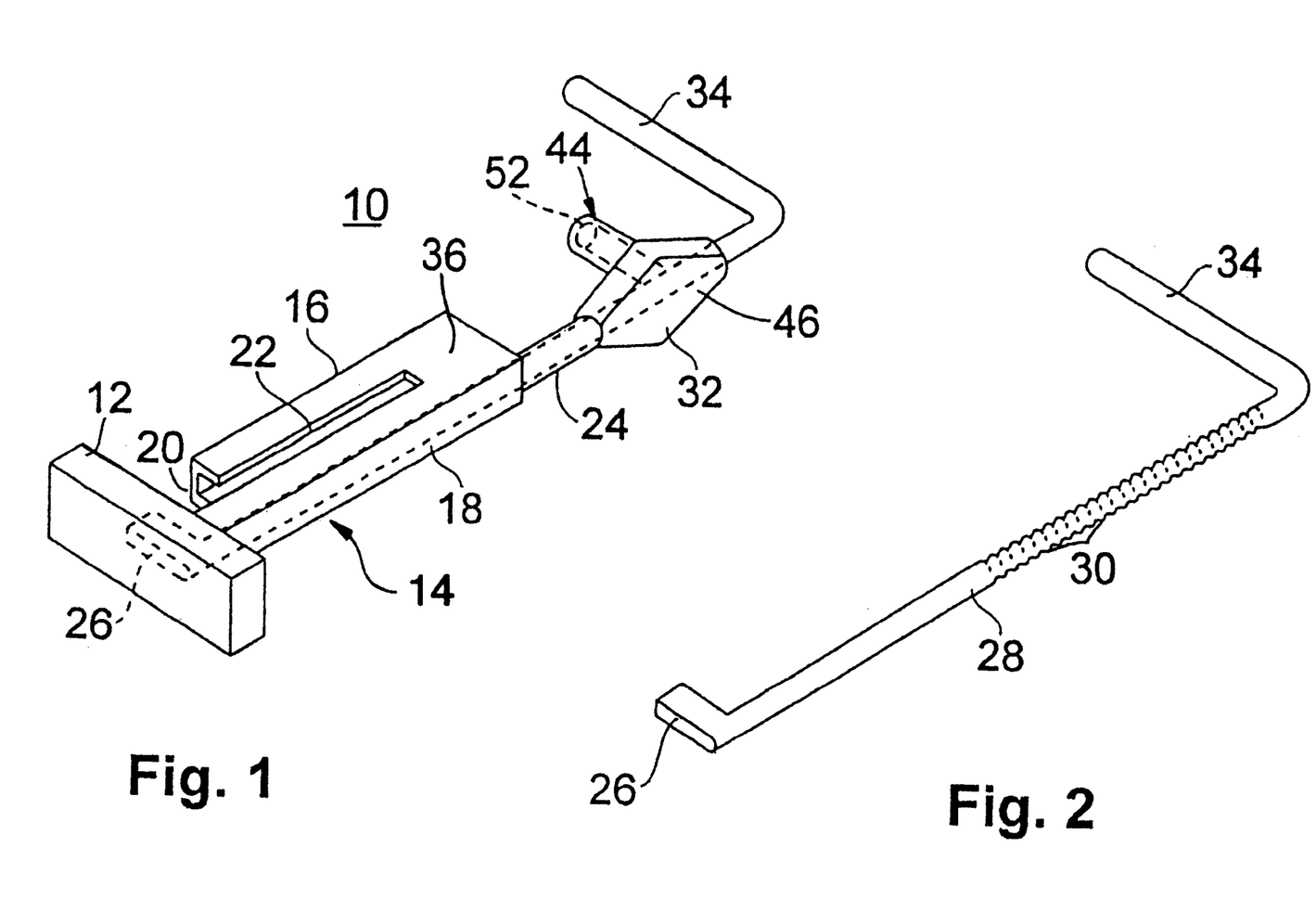
FIG. 1 is a perspective view of the anti-theft device of a first preferred embodiment of the present invention.
FIG. 2 is a perspective view of the handle and lock pin utilized with the brake lock mechanism of the anti-theft device as shown in FIG. 1.
Figure 3:
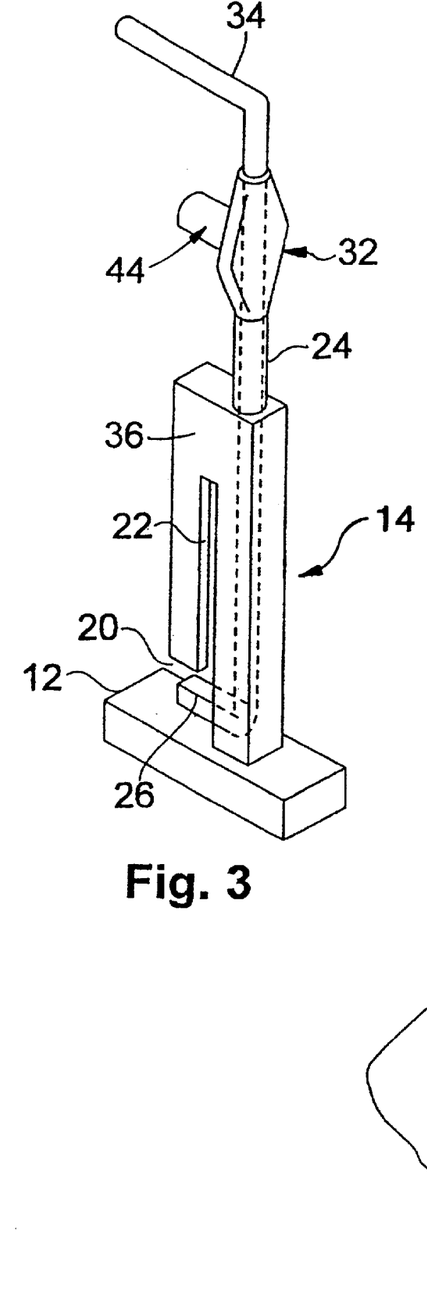
FIG. 3 is a perspective view of the anti-theft device shown in FIG. 1 in an inactive position.
Figure 4:
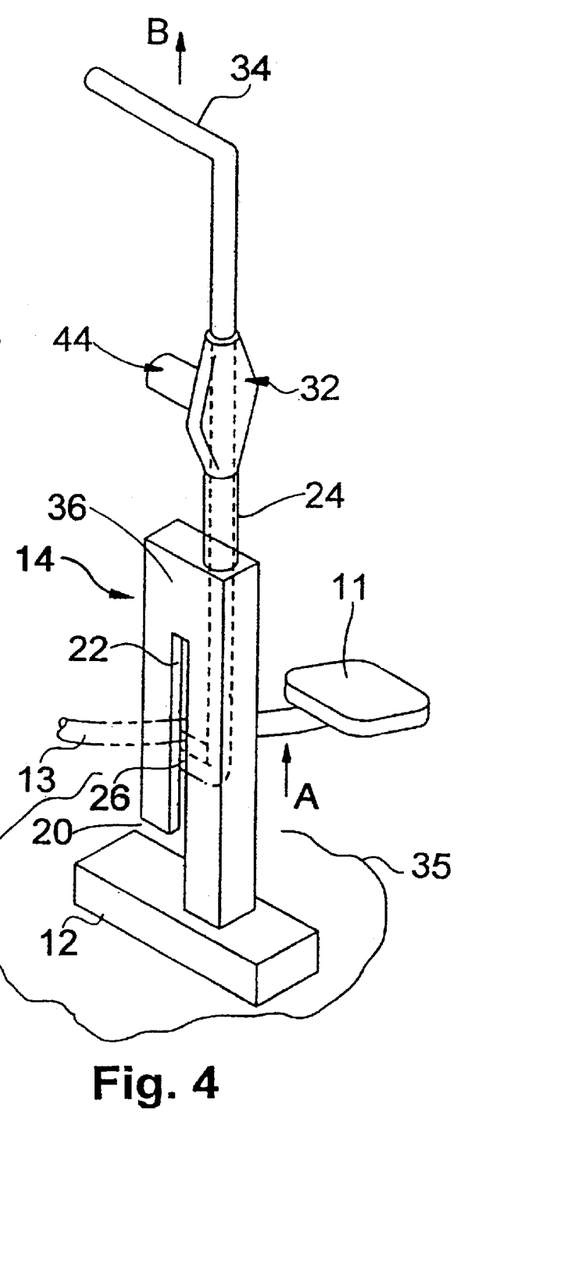
FIG. 4 is a perspective view of the anti-theft device shown in FIG. 1 in an activated position.
Figure 7:
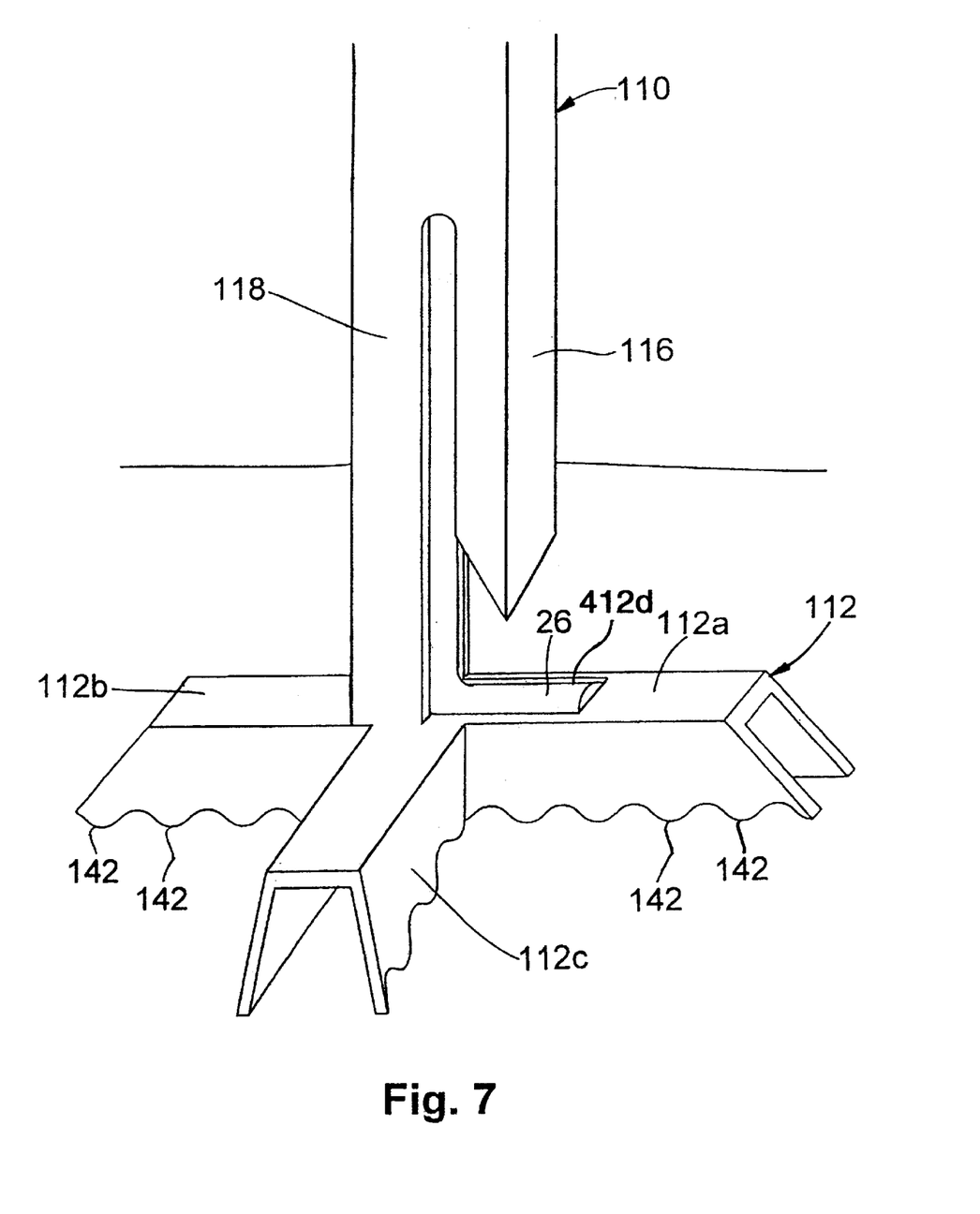
FIG. 7 is a perspective view of an alternative base embodiment for use in the second preferred embodiment shown in FIG. 5.

Extending from the base 12 is a generally U-shaped housing 14. The U-shaped housing includes a second leg 18 attached to the base 12, a first leg 16 shorter than the second leg 18, and a cross member 36 connecting the first and second legs 16, 18 to define a gap or opening 20 between the first leg 16 and the base 12 and a slot 22 between the first and second legs 16, 18. The opening 20 facilitates the placement and removal of the brake pedal shaft 13. In a preferred embodiment, the slot 22 should have an approximate width of the pedal shaft 13 such that the pedal shaft 13 extends through the slot 22 and up to an extended position. In other words, the opening 20 and slot 22 are sufficiently large to receive the brake pedal shaft 13 and permit travel of the pedal shaft 13 through the slot 22. In the extended position, the brake pedal 11 can be depressed freely as it extends downward through the slot 22. Referring to FIG. 7, the base 12 includes an aperture 412d, generally aligned with the slot 22, through which the shaft 13 is insertable into the opening 20.

The invention further comprises a locking mechanism indicated generally at 32 associated with a second leg 18 of the U-shaped housing. The locking mechanism includes a lock 44 with a lock housing 46 containing a lock cylinder 52. Extending between the second leg 18 of the U-shaped housing 14 and the lock 44 is a cylindrical tube 24. The second leg 18, the cylindrical tube 24, and the lock housing 46 are preferably a unitary assembly constructed from individual parts, preferably welded together. It will be recognized by those of ordinary skill in the art that the cylindrical tube 24 need not be cylindrical, but may be any hollow structural member, including channel stock, box-section stock, etc. and that the second leg 18 and cylindrical tube 24 can be made from a single piece (not shown).

The locking mechanism 32 also includes a slidable locking pin 26, which is provided at a first end of a rod 28 which passes through the cylindrical tube 24, second leg 18 and the lock housing 46. The rod 28 also includes lock ratchets or serrations 30 preferably machined along the mid-section of the rod 28 to at least a point where the serrations 30 pass through the lock housing 46 between both the raised and lowered or retracted positions of the locking pin 26. The second end of the rod 28 preferably comprises a handle 34 which is used to pull the rod 28 upward or push the rod 28 downward relative to the base 12. The preferred locking mechanism 32, which is utilized in the present invention may include a commercially available key operated steering wheel lock cylinder including a movable latch member, which can be releasably engaged with the serrations 30. Other locks are contemplated for the present invention including combination locks.

The locking mechanism 32 has both an unlocked state and a locked state. In the unlocked state, the rod 28 is free to slide through the lock housing 46. The unlocked state provides for installation and removal of the anti-theft device 10 by permitting the rod 28 to be positioned (i.e., retracted) such that the locking pin 26 does not obscure the opening 20 or slot 22. Preferably the locking pin 26 is fully received by the base 12 during installation and removal of the device 10 but it will be appreciated that full retraction of the pin 26 will not always be required and that only partial retraction as shown in some later figures may be sufficient. In the locked state, the lock 44 locks the ratchets 30 at the appropriate point as discussed more fully below. As shown most clearly in FIG. 4, as the rod 28 is moved in an upward direction, away from the base 12, the locking pin 26 enters the slot 22 and moves upwardly (Arrow A), thus securing the bottom of the pedal shaft 13 in an upward or unextended or inoperable position so that the pedal 11 cannot be operably depressed. Because the pedal 11 cannot be operably depressed, the car cannot be placed in gear in vehicles containing BPSI, cannot be started in vehicles with CPSI, and in vehicles with and without BPSI or CPSI, cannot be driven normally as either the brake or clutch pedal 11 cannot be depressed to brake the vehicle or shift a standard transmission.

In the present description, several preferred embodiments will be discussed. Each later-described preferred embodiment of the anti-theft device 10 has the same basic features as the previous preferred embodiments, so only particular additional or modified features as will be discussed. Accordingly, descriptions of the features of the latter-described preferred embodiments that are the same as those of the earlier-described preferred embodiments are not repeated. Instead, identical elements have been given identical element numerals throughout and only the differences between the earlier-described preferred embodiments and the latter-described preferred embodiment will be described, with numerals incremented by hundreds being used for new or revised features of like elements.

Figure 5:
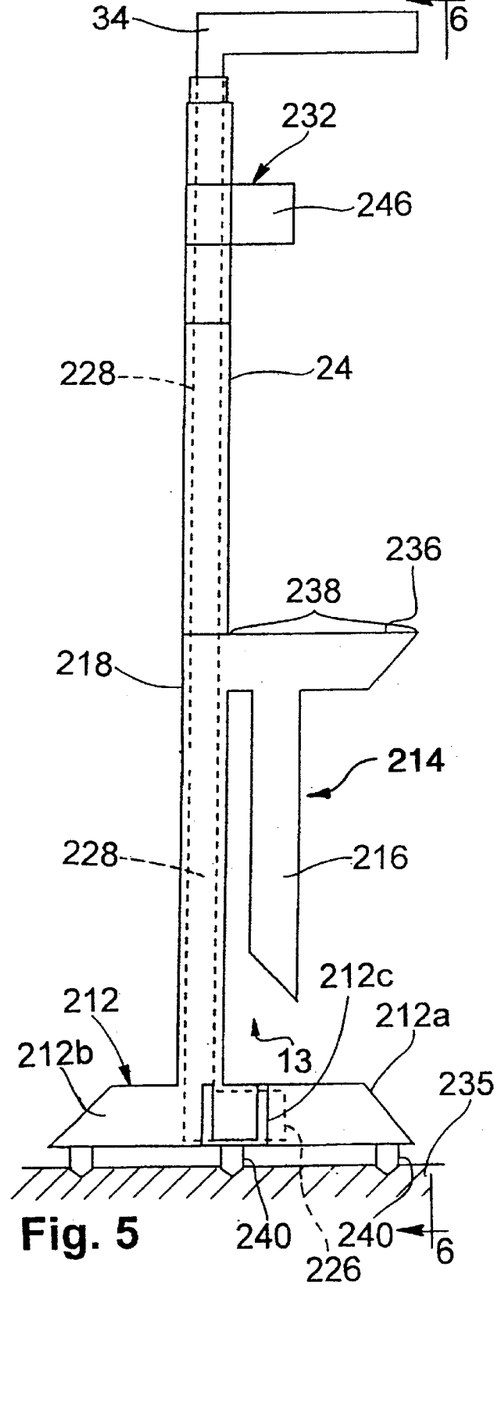
FIG. 5 is a side elevational view of a second preferred embodiment of the anti-theft device of the present invention.
Figure 6:
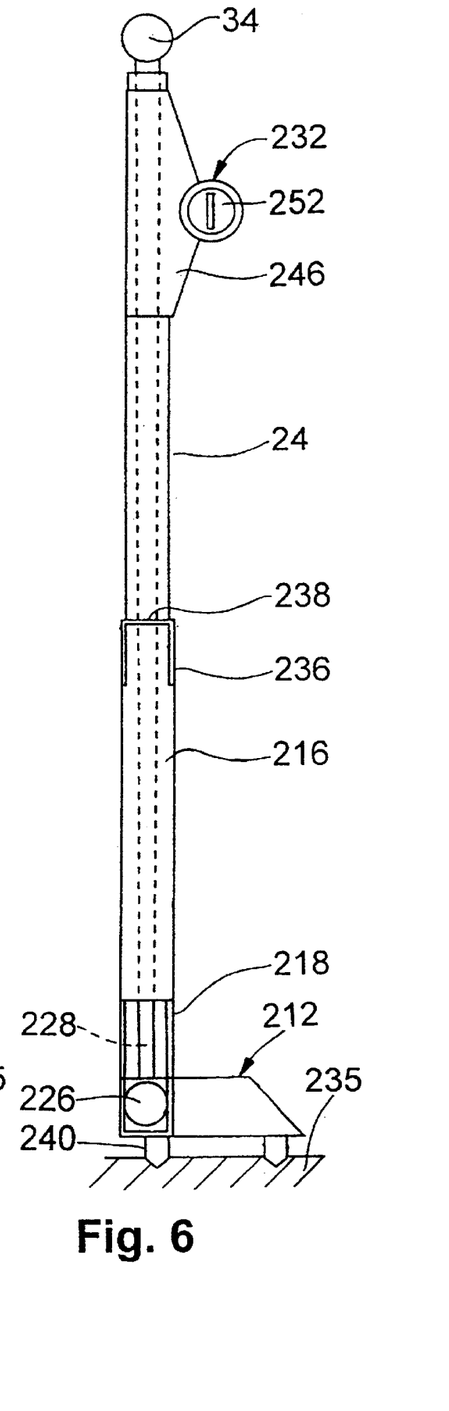
FIG. 6 is an elevational view of the second preferred embodiment of the anti-theft device of the present invention along line 6—6 of FIG. 5.

A second preferred embodiment 210 of the present invention is shown in FIGS. 5 and 6. As shown in FIG. 5, the base 212 has three leg portions 212a, 212b, and 212c, configured in a generally T-shaped pattern. The advantage of a T-shaped pattern is that it provides greater stability and maximum strength and support to the anti-theft device 210 when installed, in addition to reduced weight, in comparison to the solid rectangular base 12. The outboard ends of the leg portions 212a, 212b, 212c and the bottom of the first leg 216 suggestedly are beveled preferably at 45 degree angles, so that the pedal shaft 13 can more easily be guided into and out of the slot 22 when the device is installed and removed from the pedal shaft 13.

The second preferred embodiment 210 further incorporates an elongated cross member 236 for enabling the driver to press the device into the floorboard or carpet of the vehicle. The elongated cross member 236 extends horizontally from the top of the first leg 216, thus providing a sufficient surface area 238 for the foot of an operator to press downward. It is contemplated that the surface area 238 could include a gripping top surface.

The second preferred embodiment 210 further incorporates studs 240 which extend downward from the base 212 and which facilitate the positioning and retention of the device 210 against a floor particularly a carpeted floor 235 in the vehicle. The studs 240 prevent the device 210 from moving with respect to the floor. As shown in FIG. 7, a device 110 may also incorporate cleats 142 which are cut into or otherwise provided in the bottom of the base 12. It is contemplated that a combination of studs 240 and cleats 142 could be used without departing from the scope and spirit of the invention. Lock housing 246 is smaller than housing 46 and hangs the lock cylinder across rod 28.

The operation of the present invention is now described with reference to the enclosed figures and most particularly FIGS. 1 through 4. The driver or operator desiring to utilize the device 10 (110 or 210) unlocks the device and lowers the pin 26 all the way down to the base 12 (112, 212) by grasping the handle 34 and pushing the handle 34 toward the base 12 (112, 212). The base 12 (112, 212) is then placed on the floor 35 beneath the pedal shaft 13 which is located generally beneath the steering wheel and steering column (neither shown in FIGS. 1–6). The pedal shaft 13, is then passed through the opening 20 in the U-shaped housing 14 (214) and into the slot 22 with the base 12 (112, 212) positioned squarely on the floor 35 of the vehicle. The operator then pulls the handle 34 upwardly (Arrow A in FIG. 4), thus raising the locking pin 26 upward into the slot 22 and securing the bottom of the pedal shaft 13 so as to lock the brake (or clutch) pedal 11, as appropriate, is in an upward position. As is shown in FIGS. 5 and 6, the operator can place his foot on the surface area 238 of an elongated cross member 236, if provided, to maximize the downward thrust of the device 210 against the floor 35 of the vehicle. If provided, the cleats 142 and/or the studs 240 secure the device against the carpet or other surface of the floor 35 beneath pedal 11. The vehicle operator then locks the device 10 (110, 210) in this position using the lock mechanism 32 (232) such that the pedal 11 cannot be depressed, thereby disabling the operation of the vehicle.

Figure 8:
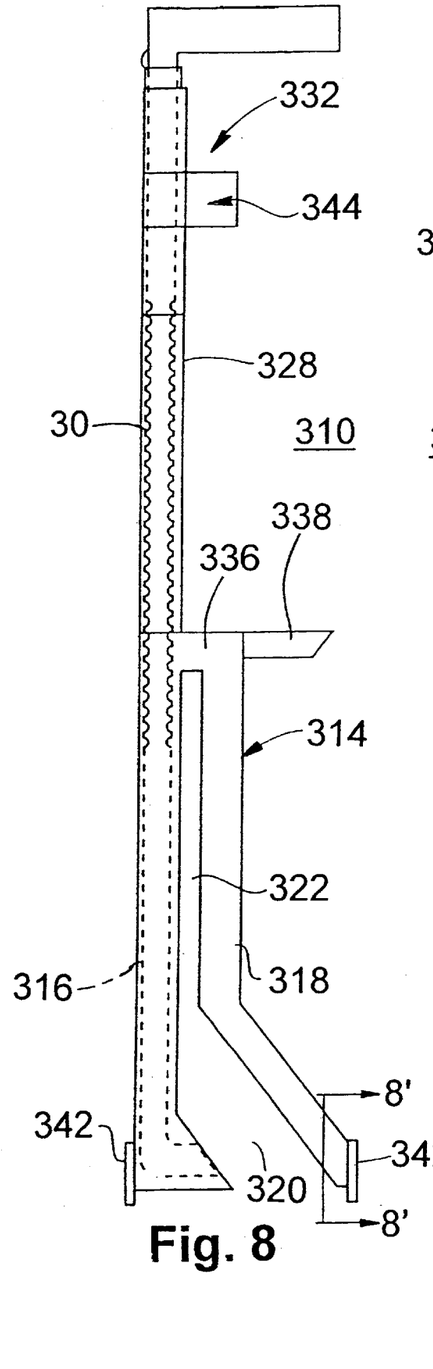
FIG. 8 is a front elevational view of a third preferred embodiment of the anti-theft device of the present invention.
Figures 8A, 8B:
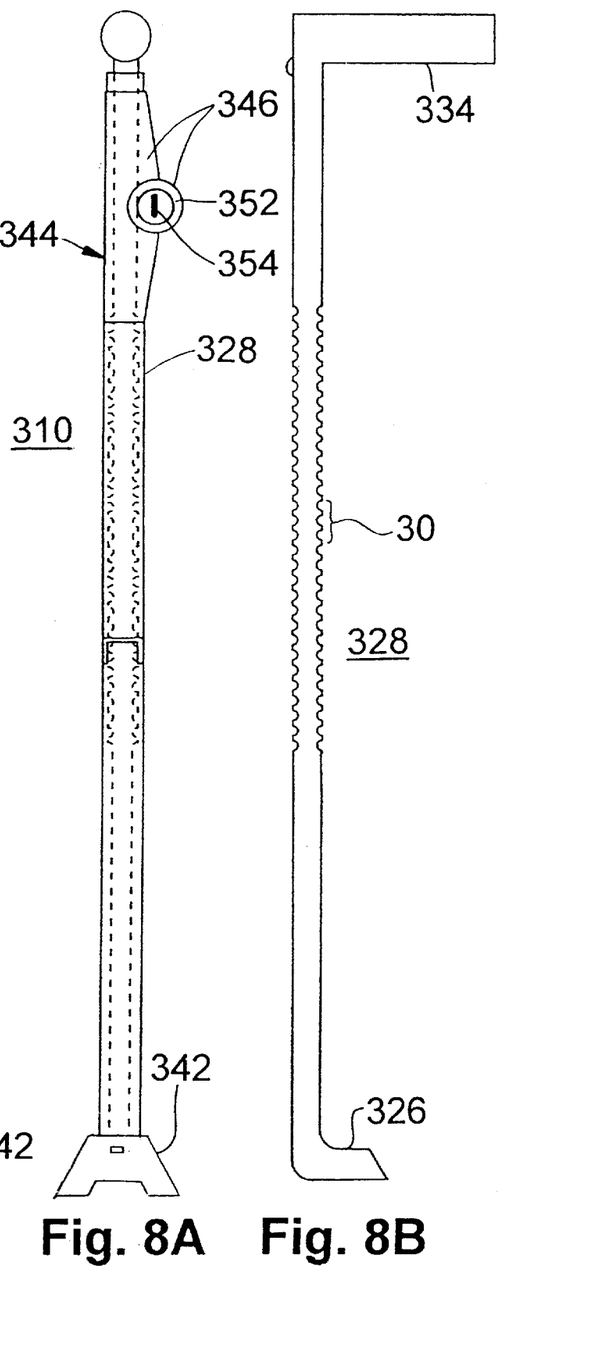
FIG. 8A is a side elevational view of the anti-theft device shown in FIG. 8.
FIG. 8B is a side elevational view of the handle/rod/locking pin element of the anti-theft device shown in FIGS. 8 and 8A.

FIGS. 8–8B illustrate a third preferred embodiment device 310 of the present invention. In this embodiment, the first and second legs 316, 318 are of substantially equal height and thus eliminate the need for a base as shown and described with respect to the first and second preferred embodiments. The first and second legs 316, 318 are spaced at the bottom to form an opening 320 which is tapered to slide over the pedal shaft 13, permitting the pedal shaft 13 to enter the slot 322, which begins at the narrow end of opening 320. The locking pin 326 is pulled upward by rod 328 thereby locking the pedal 11 and shaft 13 in an upward position as in the other embodiments described herein. The third preferred embodiment 310 further includes two rotatable feet 342, which are attached to the bottom of the first and second legs 316, 318 and which facilitate the pivotable support and positioning of the device 310. The main attribute of this embodiment is to facilitate ease of placement of the device 310.

Referring now to FIGS. 9–13, there is shown an anti-theft device 410 in accordance with a fourth preferred embodiment of the present invention. The locking mechanism 432 of the fourth preferred embodiment includes a locking pin 426 and a lock 444. As with the previously-described preferred embodiments, the locking pin 426 is at one end of an elongated rod or shaft 428 (see FIG. 15) movable through the second leg 418 of the U-shaped housing 414 and the cylindrical housing 24. The locking pin 426 is selectively movable on the U-shaped housing 414 between a raised position shown in FIG. 13 and a retracted position shown in FIG. 12. In the raised position, the locking pin 426 is sufficiently close to a lower side of the pedal shaft 13 to prevent the pedal shaft 13 from being operably depressed, that is depressed sufficiently to enable the vehicle to be started and/or normally controlled. In the retracted position, the locking pin 426 permits travel of the pedal shaft 13 through the slot 22 and opening 20. The locking pin 426 of the fourth preferred embodiment 410 embodies a significant improvement over the designs of the first through third preferred embodiments in that the upper, pedal shaft contacting surface 426a of the locking pin 426 is generally flat in a direction facing the pedal shaft 13. By providing a flattened shaft contact surface 426a, a larger contact region between the locking pin 426 and the pedal shaft 13 is created, thereby resulting in a more secure installation of the anti-theft device 410.

Figures 14, 15, 16:
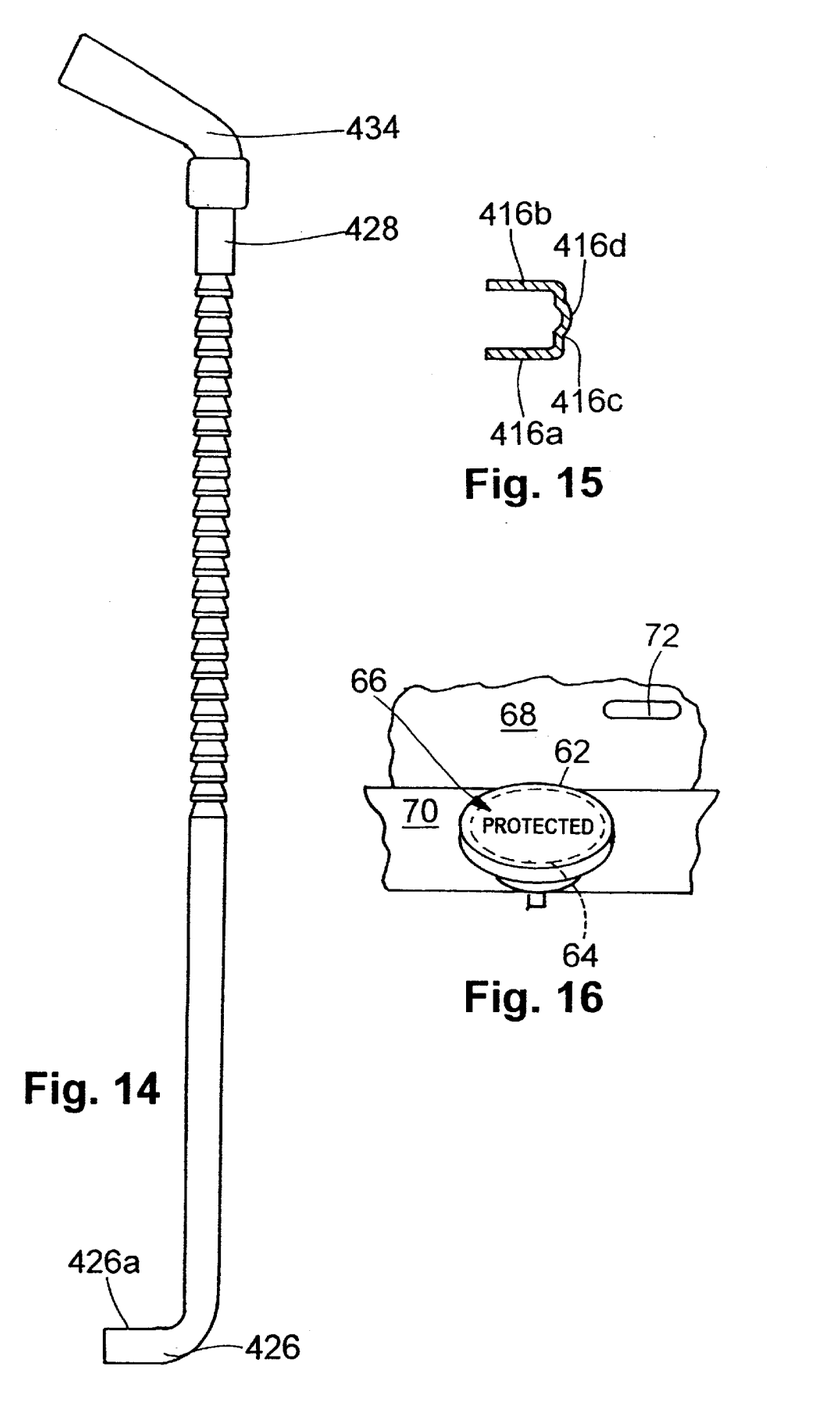
FIG. 14 is a top plan view of a leg of the anti-theft device shown in FIG. 10, taken along line 14—14 of FIG. 10.
FIG. 15 is a side elevational view of the rod, handle and locking pin of the anti-theft device shown in FIG. 19.
FIG. 16 shows a banner on a steering wheel.

On the opposing end of the rod 428 from the locking pin 426 is a handle 434, which differs from previous handles 34, 234, 334 of the first through third preferred embodiments in several ways. First, the handle 434 is preferably threaded onto the rod 428. This is an improvement in security over prior designs, like embodiment 10, where an adhesive method of securing a smooth bored handle 34 to the end of a smooth rod 28 was employed. It is also contemplated that the handle 434 could be further attached to the rod 428 by welding, brazing, or the like, such that a secure, unitary structure is created preventing the unthreading of the handle 434 from rod 428. Second, the handle 434 is attached to the rod 428 at a non-perpendicular angle to the rod 428. This design presents a great advance in security over prior designs in that where the handle 34 and rod 28 are joined in a perpendicular angle, a thief may use a hammer to strike the handle 34 in an effort to break the lock 44. Because the handle 34 was perpendicular to the rod 28, a direct blow to the handle 34 was readily achievable and the entire force of the blow would be transmitted through the rod 28 to the lock 44, thereby defeating the lock 44. However, where handle 434 is at a non-perpendicular angle to the rod 428, a thief cannot achieve a direct blow to the handle 434 or the top of the rod, parallel to the rod, as the handle 434 will deflect at least a portion of the force of the blow. More preferably, the upper surface of handle 434 is smoothly curved and extends away from the base 414 in a generally convex shape to further deflect impacts from directly above the rod 428. Third, the handle 434 is made in one smooth piece without seams and with a smoothly varying, creaseless, seamless outer surface above rod 428, which does not have any edges to be engaged by a tool (e.g. chisel, saw or drill).

Figure 9:
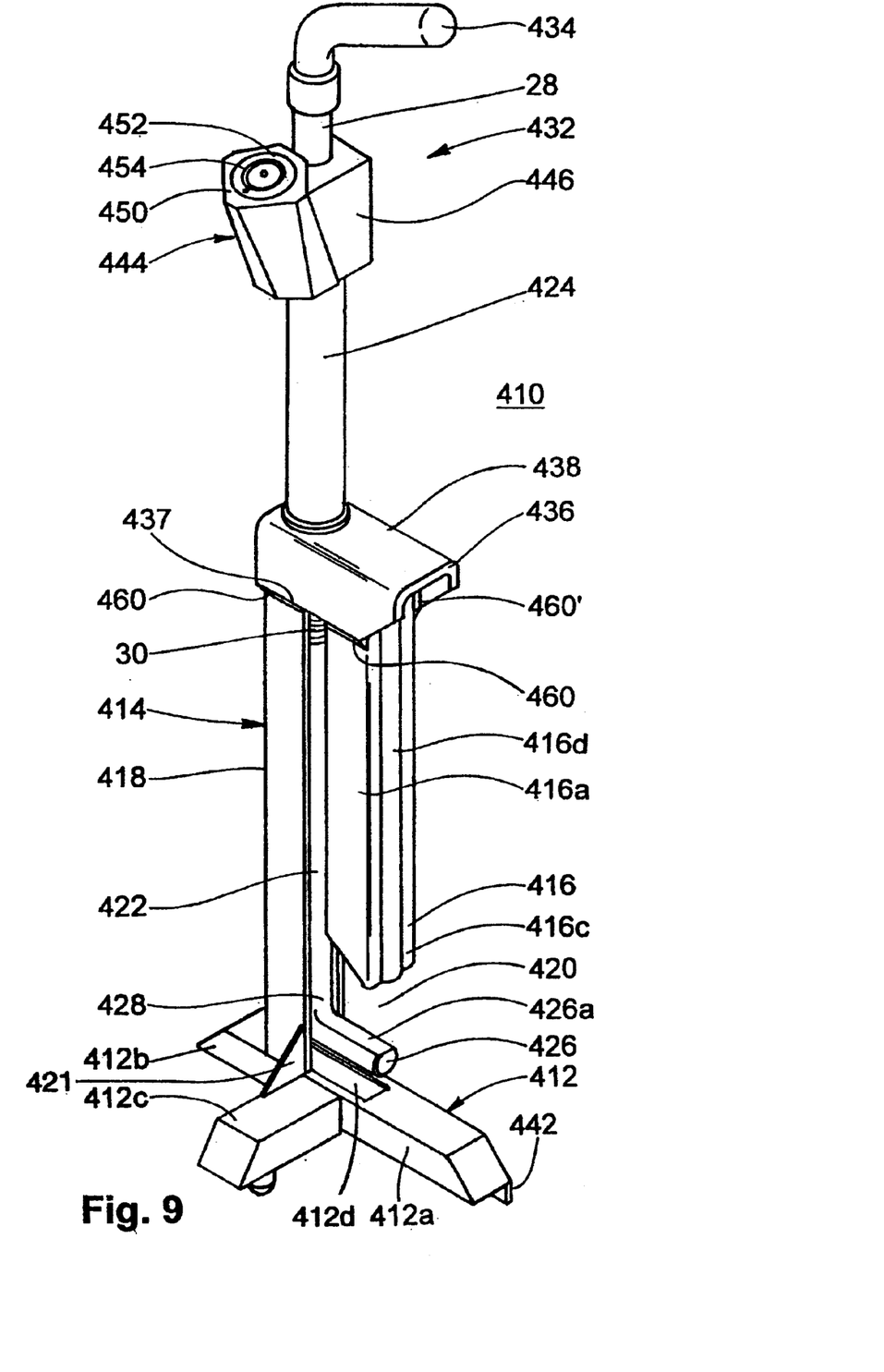
FIG. 9 is a perspective view of a fourth preferred embodiment of the anti-theft device of the present invention in an inactive position.

Lock 444 is integrated into and is coupled to the U-shaped housing 414 through cylindrical tube 424. Lock.444 includes a cylinder 452 with the operative mechanical components in a housing or head 454. The lock 444 is operatively connected to the locking pin 426 to fix the locking pin 426 in at least the raised position through engagement of the lock 444 and the serrations 30 of the rod 428. The lock 444 has an upper face 450 with a key opening 454. The lock 444 is preferably a barrel type with a circular key opening 454 accepting a cylindrically shaped, barrel-type key 458 for greatly increased security in comparison to standard blank-type (flat) keys (not shown). Barrel-type key locks are particularly resistant to being picked and to being broken with slide hammers. A sheet metal screw attachment is commonly fitted to the end of a slide hammer and is easily screwed into locks that accept blank-type (flat) keys. The slide hammer is then used to pull the lock cylinder from its housing, thus defeating the security device. It is much more difficult for one to use this technique to defeat a lock having a circular key opening 454 and barrel-type key 458 as the sheet-metal screw attachment cannot readily be attached to such a lock.

Figure 10:
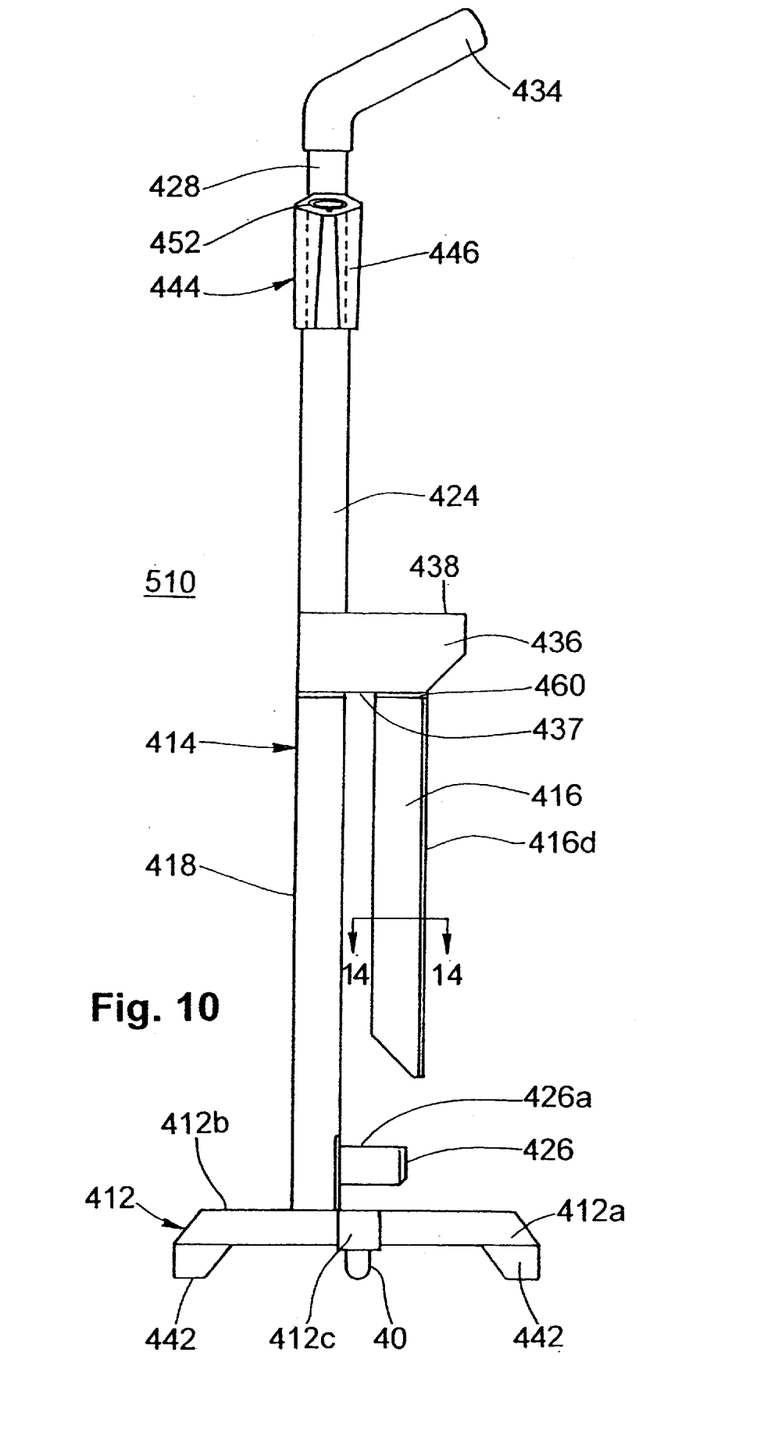
FIG. 10 is a front elevational view of the anti-theft device shown in FIG. 9.
Figure 11:
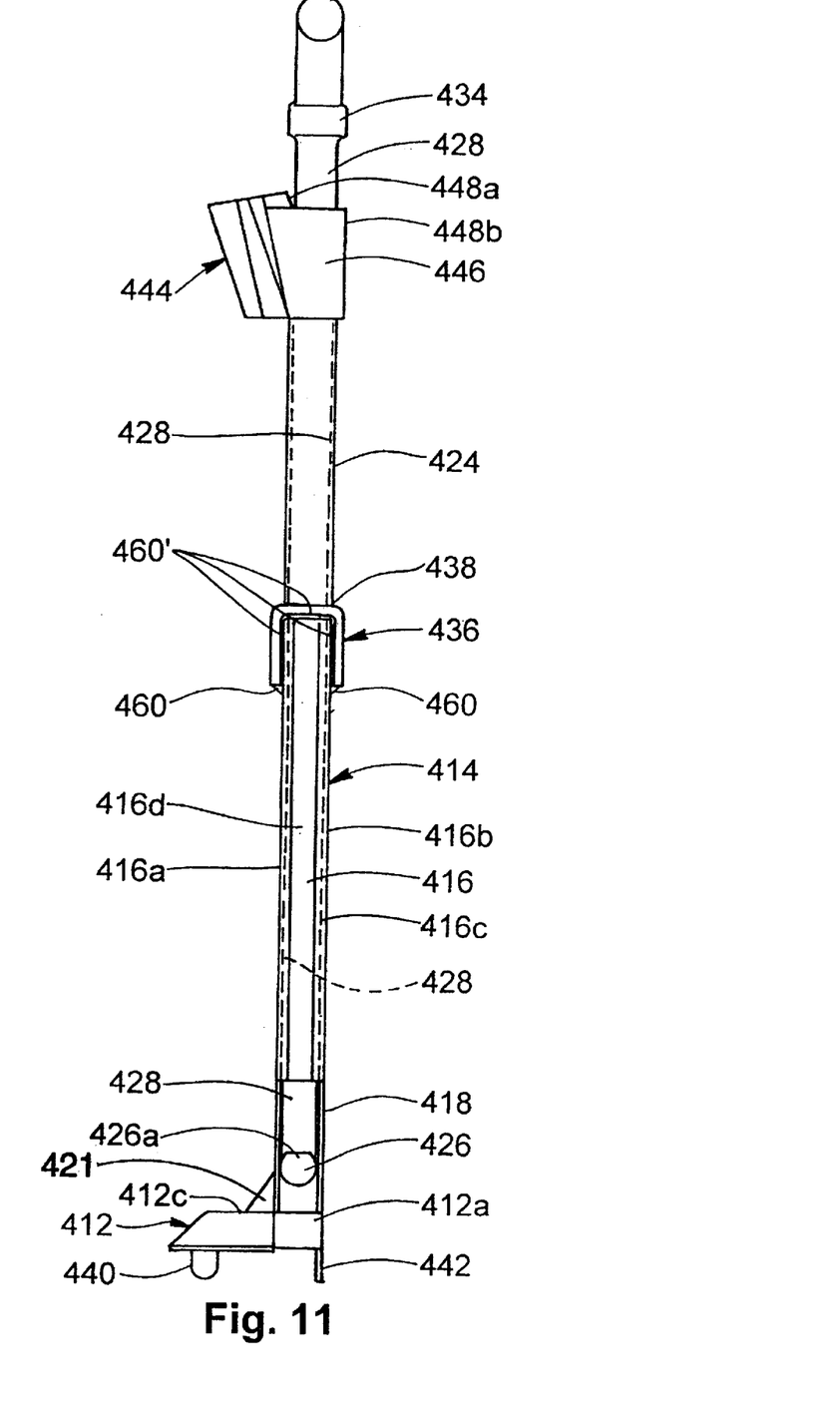
FIG. 11 is a side elevational view of the anti-theft device shown in FIG. 9.
Figure 12:
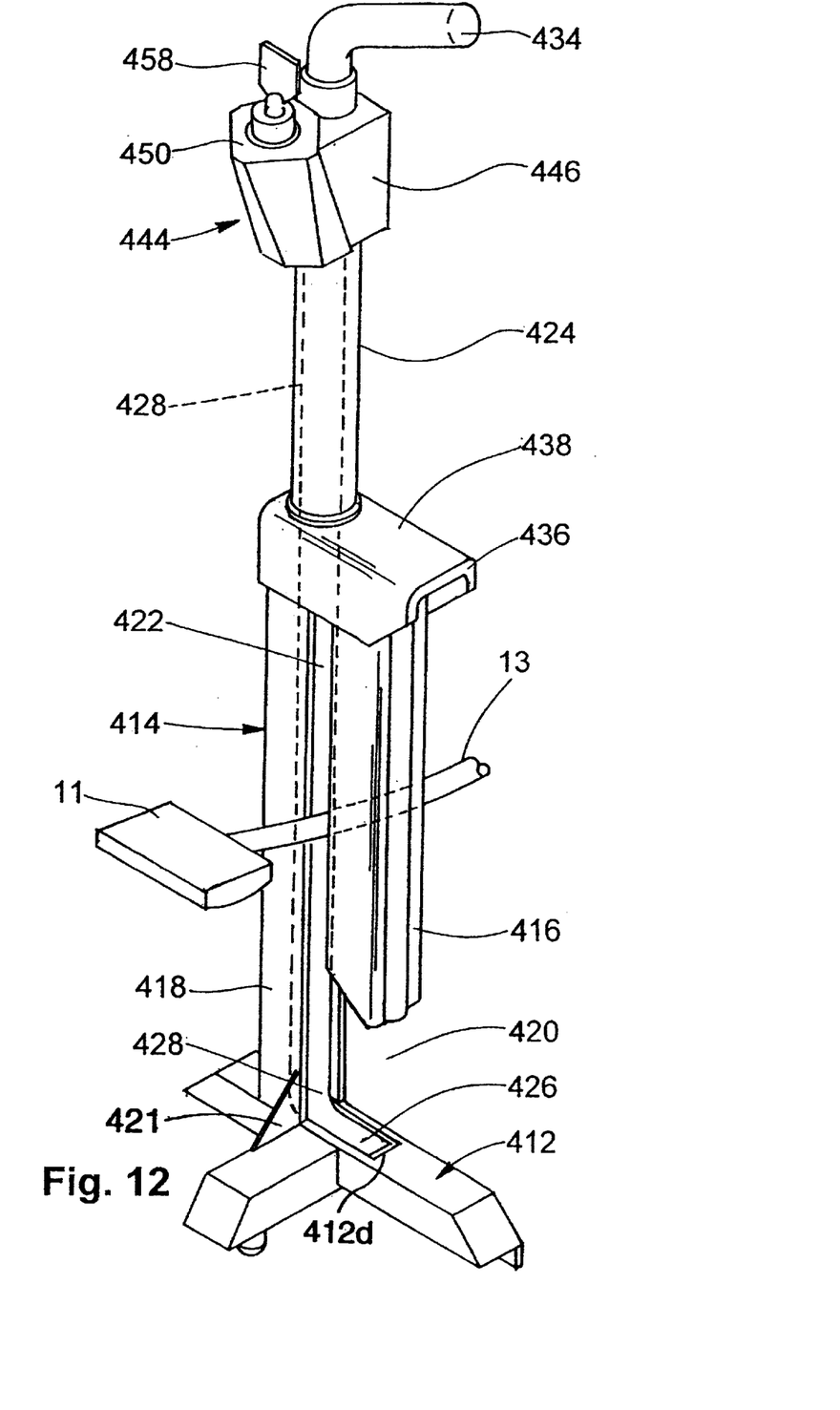
FIG. 12 is a perspective view of the anti-theft device shown in FIG. 9 with the locking pin in a fully retracted position
Figure 13:
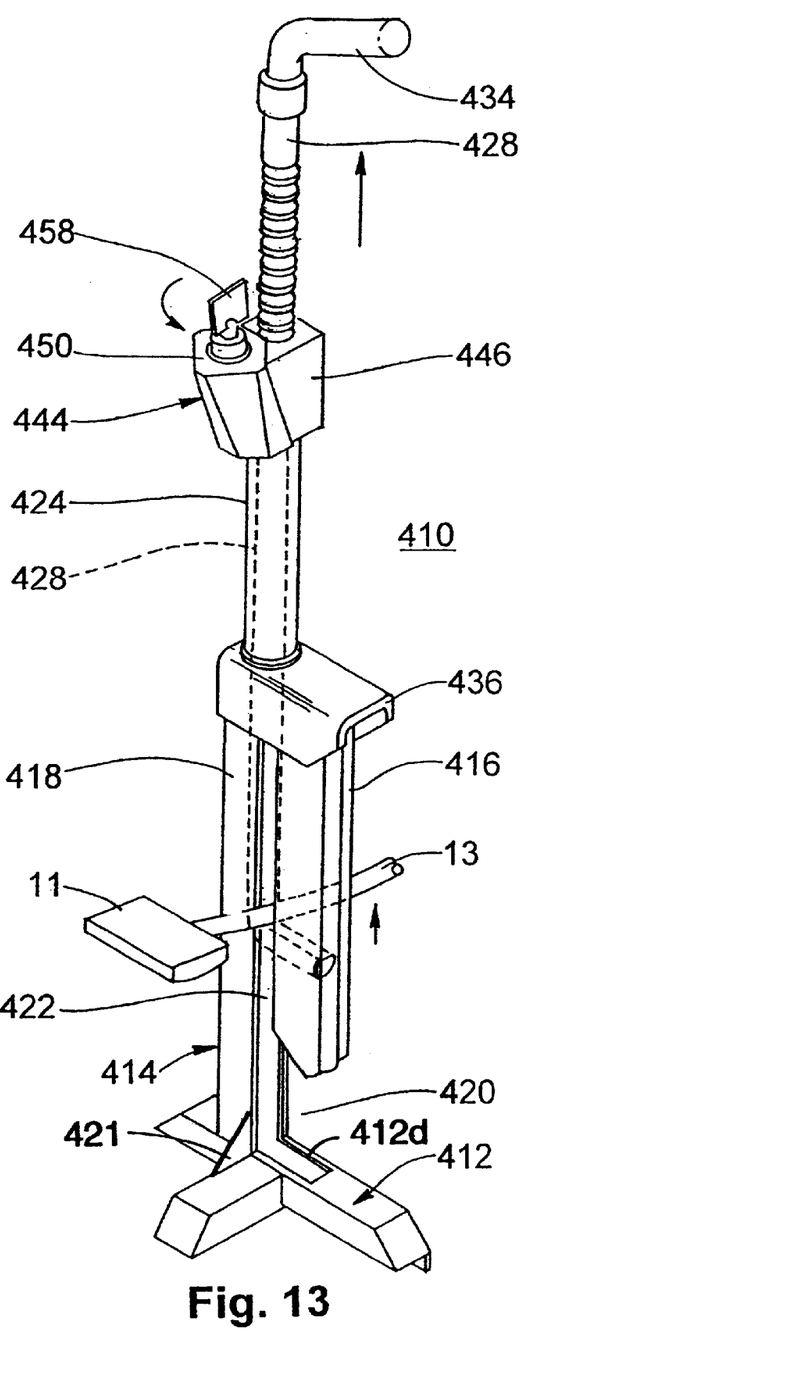
FIG. 13 is a perspective view of the anti-theft device shown in FIG. 9, in an activated position with the locking pin raised.

Lock housing 446 extends from the top of cylindrical member 424 in the direction of base leg portion 412c towards the operator seated in front of the device 410. The upper face 450 of the lock 444 and lock cylinder 452 faces substantially oppositely away from the base 412. Preferably the upper face 450 is pitched at an angle which is transverse (i.e. non-perpendicular and non-parallel) to a support plane defined by the bottom of the base 412 (or more particularly, the bottoms of stud 440 and cleats 442). The face is pitched downwardly from the plane of the base suggestedly at an angle of between about 15 and 30 degrees, more particularly between about 20 and 25 degrees. Orientation of the upper face 450, and hence the cylinder 452 in a direction substantially oppositely away from the base 412 obviates problems encountered with previous locking anti-theft mechanisms where the locks faced in a lateral direction (i.e., the first three embodiments). In using those previous designs, if for example the lock faced leftwardly and the operator was right handed, the operator had to use his or her off-hand to operate the lock to fix the anti-theft device. The orientation of the upper face 450 of the lock 444 of the fourth preferred embodiment 410 solves this problem by enabling the operator to use his or her dominant hand to fix the device 410 to the vehicle. Additionally, orientation of the upper face 450 in a direction substantially oppositely away from the base 412 provides additional security with respect to cutting through the lock housing 446 with a saw. In prior designs like the first three embodiments, where the lock housing 50 positioned the lock cylinder 52 in a direction perpendicular to the rod 28, the side of the lock housing 46 surrounding the lock cylinder 52 could readily be engaged by a hacksaw, thereby permitting one to cut through the lock 44 to defeat the device 10. Directing the upper face 450 oppositely away from the base 412 eliminates any substantial upper surface to which one can engage a hacksaw and further serves to deflect blows delivered from above the device 410. Further, at least one gusset 421 extends between the U-shaped housing 414 and one of a first elongated member 412a and 412b and a second elongated member 412c.

In the same vein, the lock cylinder 452 is protected by the lock housing 446, which surrounds the lock cylinder 452. The lock housing 446 preferably has more than four lateral sides. For example, eight lateral sides are depicted forming the perimeter of the upper face 450 in FIG. 9. Only the side 438a closest to rod 28 (FIG. 11) is rectangular. The remaining seven lateral sides surrounding upper face 450 are triangular or trapezoidal. The only other rectangular lateral side is side 438b (also FIG. 11). By providing more than four lateral sides 448, and particularly non-rectangular sides, one is presented with great difficulty in perpendicularly engaging the intersection of the upper face 450 and the lateral sides 448 or any of the lateral sides 448 directly with a hacksaw. A perpendicular engagement between a hacksaw blade (not shown) and the surface intended to be cut is optimal for efficient cutting.

Suggestedly, lock 444 includes a separate latch member in housing 446 which engages the serrations 30 of the rod 428 to secure the rod 428 and locking pin 426. The latch preferably is spring loaded into engagement with the serrations and is disengaged only by rotation of the inner member of the cylinder 452 turned by key 458. Thus, the latch is not part of the cylinder but the cylinder 452 is need to disengage the latch. Therefore, destruction of the cylinder 452, for example by drilling it out, will not release the latch. The internal latch is further protected from attempting to freeze the cylinder to shrink it.

To further enhance the security of the lock 444, the lock housing 446 is made from a tough material to prevent the lock 444 from readily being defeated by cutting or impact, preferably hardened steel. To further increase security of the present invention, the legs 416, 418 and cross member 436 of the generally U-shaped housing 414 and cylindrical tube 424 of the fourth preferred embodiment device 410 are also made from similarly tough material, preferably hardened steel. While it is contemplated that other tough metals (e.g., stainless steel) could be employed without departing from the scope and spirit of the invention, hardened steel provides an optimal balance between high strength and thus security and expense.

As discussed above, the first leg 416 and second leg 418 of the U-shaped housing 414 are connected by cross member 436. In the fourth preferred embodiment 410, the cross member 436 overlaps each of the first and second legs 416, 418 and presents lower edges 437 of the cross member 436 overlapping the legs 416, 418 and which are welded to the upper sides of the first and second legs 416, 418 by welds 460 best seen in FIGS. 9–11. By overlapping the cross member 436 with the first and second legs 416, 418, rigidity of the first and second legs 416, 418 and the U-shaped housing 414 is increased. Accordingly, security of the anti-theft device 410 is greatly increased. As shown in FIGS. 9 and 11, it is also preferred that the cross member 436 be welded at 460' to the first leg 416 along the horizontal and two vertical interior intersections of those two members to further increase structural integrity of the anti-theft device 410 and prevent the removal of the first leg 416 from the housing 414. Cross member 436 preferably extends fully across second leg 418 and rod 428 is passed through the cross member 436 to deter disassembly of housing 414.

It is suggested that at least one of the first and second legs 416, 418 be modified from ordinary channel stock. Referring to FIG. 14, preferably first leg 416 is a generally U-shaped member (when viewed in axial cross section) with opposing parallel arms 416a, 416b joined by a cross wall 416c. Preferably, the cross wall 416c has a deflection, preferably an outward bow 416d between the pair of arms 416a, 416b, for increased longitudinal stiffuess of the leg 416 (and/or 418) with respect to ordinary channel stock. Forming at least one of the first and second legs 416, 418 as a generally U-shaped member like member 416 with bowed or otherwise stiffened cross wall overcomes a significant drawback of prior designs that employed simple channel stock of three straight, perpendicular walls to form the first and second legs 16, 18. The longitudinal stiffness of straight sided channel stock is significantly lower than that of the U-shaped configuration with a deflected cross wall 416c. It is correspondingly easier to defeat a security device having first and second legs 16, 18 made from simple channel stock simply by bending the first leg 16 such that the pedal shaft 13 can be removed from the slot 22 between the pin 26 and the bent leg 16. It is also contemplated that other cross sectional shapes of the leg 416 and of the walls 416a, 416b and/or 416c in particular could be used to form the first or first and second legs 416, 418 for increased strength without departing from the spirit and scope of the present invention.

FIG. 15 depicts rod 428 with serrations 30, locking pin 426 and handle 434. Preferably the rod 428 and pin 426 are formed from a single piece of hardened steel. As mentioned earlier, handle 434 is separately formed from a single piece of tough material, preferably forges from hardened steel, and threaded onto rod 428.

Any of the anti-theft devices 10, 210, 310, 410 can be combined with a banner configured for attachment to the vehicle to announce the use of the device. As shown in FIG. 16, the banner 62 preferably is a cover configured for attachment to the steering wheel 64 of the vehicle. The banner 62 preferably has a logo 64 or other identifying indicia to inform would-be thieves that the vehicle is immobilized through use of the anti-theft device 10, 210, 310, 410. In this way, notwithstanding that the anti-theft device is not readily visible because it is used below the steering wheel and dashboard in the leg compartment of the vehicle, a would-be thief would likely not forcibly enter the vehicle only to discover after having caused substantial damage to the vehicle that his or her efforts would be futile. The banner need not be attached to the steering wheel 64 of the vehicle, but can be configured to be mounted in any visible location, such as on the interior surface of the windshield 68 or another window, on the dashboard 70, or hanging from a rearview mirror 72.

It is to be appreciated by those skilled in the art that the device of the present invention may include a protective outer coating composed of vinyl, PTFE, rubber or plastic.

The present invention has been described with reference to a preferred embodiment. It is to be appreciated that other embodiments fulfill the spirit and scope of the present invention and that the true nature and scope of the present invention is to be determined with reference to the claims appended hereto.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for locking a pedal of a vehicle, the pedal being supported by a pedal shaft, the device comprising:
   a base, including a first elongated member, a second elongated member and at least one gusset, the second elongated member being secured to and extending outwardly from a lateral side of the first elongated member at a predetermined angle, the base for placement on a floor of the vehicle beneath the pedal and the pedal shaft;
   a housing extending from one of the first and second elongated members and having a slot framed by the housing for receiving the pedal shaft therein, the base being fixed relative to the slot, the gusset extending between the housing and one of the first and second elongated members to provide added stability; and
   a locking mechanism for locking the pedal shaft within the slot, such that the pedal cannot be operably depressed.

2. The device as recited in claim 1 wherein the gusset comprises a generally triangular shaped member with one leg of the triangular shaped member being secured to the housing and the other leg of the triangular shaped member being secured to one of the first and second elongated members.

3. The device as recited in claim 1 wherein the gusset is secured to the housing and to the second elongated member.

4. A device for locking the pedal of a vehicle, the pedal being supported by a pedal shaft, the device comprising:
   a base for placement on a floor of the vehicle beneath the pedal and the pedal shaft;
   a housing including a slot therein for receiving the pedal shaft;
   at least one gusset extending between the housing and the base to provide added stability; and
   a locking mechanism for locking the pedal shaft within the slot such that the pedal cannot be operably depressed.

5. A device for locking a pedal of a vehicle, the pedal being supported by a pedal shaft, the device comprising:
   a base for placement on a floor of the vehicle beneath the pedal and the pedal shaft, the base including an aperture extending therethrough;
   a housing extending from the base and including a slot framed by the housing for receiving the pedal shaft, the slot being generally aligned with the aperture; and
   a locking mechanism comprising a rod having a locking pin on one end, the rod being moveable with respect to an opening in the housing between a first position wherein the pedal may be depressed and a second, locked position wherein the locking pin is in engagement with a lower side of the pedal shaft for locking the pedal shaft within the slot such that the pedal cannot be operably depressed, the opening being generally aligned with the aperture, the rod being insertable into the opening through the aperture in the base.

6. A device for locking a pedal of a vehicle, the pedal being supported by a pedal shaft, the device comprising:
   a base for placement on a floor of the vehicle beneath the pedal and the pedal shaft;
   a housing extending from the base and including a slot framed by the housing for receiving the pedal shaft; and
   a locking mechanism comprising a rod having a locking pin on one end, the rod being moveable with respect to an opening in the housing between a first position wherein the pedal may be depressed and a second, locked position wherein the locking pin is in engagement with a lower side of the pedal shaft for locking the pedal shaft within the slot such that the pedal cannot be operably depressed.

7. The device as recited in claim 6 wherein one of said housing and rod defines two generally parallel members positioned on opposite sides of the pedal shaft when the rod is in the locked position.

\* \* \* \* \*